United States Patent Office 3,850,905
Patented Nov. 26, 1974

3,850,905
CONVERSION OF ALDOSE SUGARS TO KETOSE SUGARS
Leon Tumerman, Deerfield, and Jules H. Guth, Mount Prospect, Ill., assignors to Kraftco Corporation, Glenview, Ill.
No Drawing. Filed Oct. 30, 1972, Ser. No. 301,823
Int. Cl. C07c 47/18; C13k 9/00
U.S. Cl. 260—209 R
19 Claims

ABSTRACT OF THE DISCLOSURE

Method for the manufacture of ketose sugars from aldose sugars. A solution of an aldose sugar is heated in the presence of an alkali or alkaline earth aluminate catalyst so as to convert the aldose sugar to a ketose sugar in high yield. Thereafter, the ketose sugar is recovered from the reaction mixture by particular filtration treatment.

The present invention relates to the manufacture of ketose sugars from aldose sugars and more particularly relates to isomerization of aldose sugars in the presence of an alkali or alkaline earth aluminate catalyst.

It is known to use alkali and alkaline earth aluminates, hereinafter sometimes referred to as aluminates or aluminate catalysts, to effect the isomerization of particular monosaccharide and disaccharide aldose sugars to ketose sugars. For example, it is disclosed in U.S. Pat. No. 2,487,121 to Fetzer et al., issued Nov. 8, 1949, that the monosaccharide aldose sugar, glucose, can be isomerized to the ketose sugar, fructose, by means of aluminate catalysts. It is disclosed in U.S. Pat. No. 3,546,206 to Guth et al., issued Dec. 8, 1970, that the disaccharide aldose sugar, lactose, can be isomerized to the ketose sugar, lactulose, in high yields, by means of aluminate catalysts. However, the reaction mixture which is formed when alkali or alkaline earth aluminate catalysts are used to effect isomerization of aldose sugars is not readily handled and it is difficult to recover the ketose sugar from the reaction mixture.

Accordingly, it is an object of the present invention to provide an improved method for the production of ketose sugars from aldose sugars. It is another object of the present invention to provide a method for recovering sugars from a reaction mixture containing alkali or alkaline earth aluminate materials. It is a further object of the present invention to provide an improved method for converting aldose sugars to ketose sugars and for recovering the ketose sugars from the reaction mixture. It is a still further object of the present invention to provide a method for separating aluminum hydroxyide and other gelatinous precipitates from the reaction mixtures.

These and other objects of the present invention will become more apparent from the following detailed disclosure.

Generally, the invention is directed to a method for manufacture of ketose sugars from aldose sugars by heating a solution of the aldose sugar in the presence of an alkali or alkaline earth aluminate catalyst so as to convert the aldose sugar to a ketose sugar in high yields. Thereafter, the ketose sugar is recovered from the reaction mixture by particular filtration treatment.

A surprising discovery of the present invention is that alkali or alkaline earth aluminates may be used as a general catalyst to effect isomerization of aldose sugars to ketose sugars in high yields. Preferably, the method of the invention is used to effect isomerization of mono or disaccharide aldose sugars to the ketose form. The method is particularly suitable for the conversion of lactose to lactulose and glucose to fructose. However, the method may be used to effect conversion of other aldose sugars to ketose sugars, such as maltose to maltulose, galactose to tagatose, xylose to xylulose, ribose to ribulose, allose to psicose, arabinose to erythro-pentulose, gulose to sorbose, and melibiose to melibiulose.

While not wishing to be bound by any theory, it is believed that the isomerization by aluminate salts is attained by formation of intermediate sugar-aluminate complexes. The complexes isolate the ketose sugar and permit attainment of high levels of conversion of aldose sugars to ketose sugars. Levels of conversion of aldose sugars to ketose sugars of up to about 80 percent are attained.

In effecting the isomerization reaction, a solution of an aldose sugar is first prepared. Any suitable solvent may be used which solubilizes the sugar and the aluminate catalyst and permits the isomerization reaction to occur. The preferred solvent is water. The sugar may be present in the solution at a level of from about 5 percent by weight to about 60 percent by weight of the solution.

The alkali or alkaline earth aluminate catalyst is then added to the sugar solution to provide a reaction mixture. In this connection, calcium or sodium aluminate is the preferred catalyst. Calcium and sodium aluminate are preferred for reasons of economy and availability. However, potassium aluminate, barium aluminate and strontium aluminate may also be used. The aluminate catalyst is added to the sugar solution at a level of from about 0.25 moles to about 4 moles of aluminate catalyst per mole of sugar present in the solution. It is preferred that the aluminate catalyst be present at a level of from about 1 to about 3 moles per mole of sugar.

After addition of the aluminate catalyst the reaction mixture is basic and the pH will be from about 9 to over 13. Lower levels of aluminate catalyst may be used with a corresponding decrease in conversion level and efficiency. Also, higher levels of aluminate catalyst may be used but no added advantage is attained thereby, and recovery of the sugar from the reaction mixture becomes more difficult.

The reaction mixture is then preferably heated to effect more rapid isomerization of the aldose sugar to the ketose form. The temperature of the reaction mixture is maintained in the range of from about 25° C. to about 130° C. The temperature is maintained within the indicated range for a period of time sufficient to effect isomerization to the desired level. In this connection, a period of time of from about 1 minute to about 500 minutes is sufficient. It is also possible to use high temperature short time conditions wherein the sugar solution is heated to temperatures above 130° C. for short or no hold time.

The use of an aluminate catalyst can provide a higher level of conversion of the aldose sugar to ketose sugar with less sugar decomposition than is experienced with known alkaline isomerization catalysts. Any conversion level may be obtained up to about 80 percent of ketose sugar when sodium aluminate is used as the catalyst and up to about 50 percent when calcium and barium aluminate are used as the catalyst. If it is desired to stop the reaction prior to achieving maximum conversion, the reaction mixture may be acidified or cooled, or both. However, it is usually desired to attain as high a level of conversion as possible. Known alkaline isomerization catalysts, such as calcium hydroxide and other hydroxides, have not been capable of achieving conversion levels of aldose sugars to ketose sugars of above about 25 percent. The present invention provides a method for conversion of aldose sugars to ketose sugars at any level up to about 80 percent, and the method further provides for recovery of the ketose sugar from the reaction mixture.

After the aldose sugar has been converted to ketose sugar the reaction mixture is cooled. The reaction mixture is then acidified to release the sugar from the aluminate complex. It has been found that if the reaction is allowed to proceed after a maximum conversion, some sugar degradation may be incurred.

It has been found that if the reaction mixture is allowed to remain alkaline that the ketose sugar is less recoverable, and yields are lower. As previously indicated, it is believed that during the reaction the ketose sugar becomes bound to the aluminate ion in a complex form. The ketose sugar-aluminate complex is dissociated by acidifying the reaction mixture. As the pH of the reaction mixture is lowered, the ketose sugar-aluminate complex begins to dissociate and higher levels of ketose sugar are recovered. At a pH of about 12 only about 8 percent of the ketose sugar is recovered. At a pH of about 10 over 60 percent of the ketose sugar is recoverable. At a pH within the range of about pH 6 to about pH 8, the ketose sugar-aluminate complex becomes completely dissociated. However, as the reaction mixture is neutralized to a pH within the range of 6 to 8, the aluminum from the aluminate forms an aluminum hydroxide precipitate.

For reasons of economy, hydrochloric acid is usually used to acidify reaction mixtures comprising sodium aluminate catalyst. Separation of the sodium and chloride ions, if thought desirable, is then subsequently effected by dialysis or ion exchange, as will be discussed more fully hereinbelow. As indicated, calcium aluminate does not provide as high a conversion yield as sodium aluminate. However, acidification of reaction mixtures comprising calcium aluminate with sulfuric acid results in precipitation of calcium sulfate which is easily separated from the reaction mixture by filtration.

As the aluminum hydroxide precipitates it forms aggregates which have a pasty, gelatinous character and which are notoriously difficult to filter. Conventional filtration techniques have been found practically impossible to adapt to filtration of aluminum hydroxide systems, particularly in the presence of sugars. The nature of the aluminum hydroxide precipitate is such that the pores of the filtration medium become immediately clogged upon application of pressure, whether vacuum or super atmospheric pressure. If the pore size of the filtration medium is enlarged to a point where filtration of an aluminum hydroxide system can be effected, the aluminum hydroxide particles escape through the filtration medium and contaminate the filtrate. It is a surprising discovery of the present invention that sugar slurries containing aluminum hydroxide may be filtered through membranes by maintaining a constant flow of the aluminum hydroxide slurry parallel to the membrane. The membrane should have pores large enough to permit passage of the sugar molecules but small enough to block passage of aluminum hydroxide aggregates.

In accordance with the present invention, the reaction mixture, after it has been neutralized to a pH within the range of from about 6 to about 8, is transferred to a feed tank. From the feed tank the reaction mixture is continuously cycled by pumping the reaction mixture at a predetermined pressure parallel to the surface of a membrane until a desired recovery of sugar from the reaction mixture is attained. The membrane will usually be in the form of a tube through which the reaction mixture is pumped. However, the membrane may comprise a partial surface of any closed system through which the reaction mixture may be passed in parallel and tangential flow to the membrane.

It has been determined that the method of the present invention for recovering aluminum hydroxide from the reaction mixture is dependent upon maintaining the aluminum hydroxide below a particular concentration during the separation process.

As the reaction mixture is passed across the membrane a filtrate is obtained and the concentration of aluminum hydroxide in the effluent which leaves the membrane is increased. A single pass across the membrane surface is usually not sufficient to recover sufficient filtrate to provide a desired yield of sugar. Consequently, the effluent is returned to the feed tank for recycling across the membrane. Of course, the concentration of aluminum hydroxide in the feed tank would gradually increase as the cycling of the reaction mixture continues. It has been found that the aluminum hydroxide concentration should not be allowed to increase above about 8 percent during the separation process and is preferably less than about 6 percent. The concentration is maintained relatively constant by the addition of water to the feed tank as the separation continues. As the separation process continues, the filtrate level increases and the concentration of soluble materials in the filtrate becomes decreased.

The driving force for moving the filtrate through the membrane is, of course, the pressure differential across the membrane. So long as sufficient flow is maintained parallel to the membrane, the pressure differential may be at any level below the compaction or bursting load of the membrane. The lower limit for pressure differential is dependent upon the flux rate desired. In general, the pressure differential may be from about 2 p.s.i.g. to about 2000 p.s.i.g., preferably from about 5 p.s.i.g. to about 500 p.s.i.g. The flow rate across the membrane should be at least about 1 foot per second and is preferably in the range of from about 2 feet per second to about 20 feet per second.

The membrane used in effecting the separation in accordance with the invention has an average pore size in the range of from about 10 A. to about 1000 A., preferably within the range of from about 15 A. to about 100 A.

As previously described, soluble materials in the reaction mixture of the present invention are primarily sugar and salt formed during the neutralization reaction. The sugar is primarily ketose sugar and the type of salt is independent upon the particular acid used to effect neutralization. At the start of the separation process, the sugar is present in the reaction mixture at a level of from about 5 to about 50 percent by weight. The salt is present at a level of from about .5 to about 5 percent by weight, expressed as equivalent sodium chloride. As the separation process continues, the sugar and salt in the filtrate becomes diluted due to the added water in the feed tank. In general, to recover 95 percent of the sugar, the sugar will be diluted to a level of from about 1.5 to about 15 percent by weight and the salt will be diluted to a level of from about .15 to about 1.5 percent by weight, expressed as equivalent sodium chloride.

After the soluble components of the reaction mixture have been separated from the aluminum hydroxide, the soluble components may be recovered by drying of the filtrate or the filtrate may be partially concentrated. If desired, a partition may be effected between the electrolytes of the filtrate and the sugar components of the filtrate by electrodialysis, ion exchange, or other suitable method. A ketose sugar syrup product may be obtained having less than .1 percent salt on a 70 percent by weight sugar basis and having a specific conductivity of less than about 100 mmhos/cm. Of course, if the electrolytes in the filtrate are not considered undesirable, there is no need to effect separation of the electrolytes from the sugar components. In respect to the separation of salt from sugar in accordance with the present invention by electrodialysis, it has been discovered that the sugar solution is partially decolorized by the electrodialysis. Such decolorization is desirable to provide a clear solution without other decolorization steps, such as charcoal treatment.

The method of the present invention is particularly adapted for the recovery of ketose sugar from a reaction mixture containing aluminum hydroxide. However, the method of the present invention for the separation of aluminum hydroxide from reaction mixtures is generally suitable for the treatment of other gelatinous or difficultly filterable precipitates. While not wishing to be bound by any theory, it is believed that the method of the present invention for separating aluminum hydroxide is effective because of the dynamic nature of the filtration system. That is, the aluminum hydroxide slurry is pumped at a rate such that the aluminum hydroxide particles are washed across the pores at a rate such that the pores of the membrane do not clog.

The following example further illustrates various features of the present invention but is not intended to in any way limit the scope of the invention which is defined in the appended claims.

1500 pounds of sodium aluminate trihydrate are added to a 4000 gallon jacketed reaction vat to which 600 gallons of water at a temperature of 25° C. have been added previously. The addition is made with agitation and the mixture is heated to 60° C. to solubilize the aluminate. Thereafter 3000 pounds of crystalline alpha lactose hydrate are added to the reaction vat rapidly and with continuous agitation. The temperature of the mixture is maintained at 60° C. for 50 minutes to effect conversion of 80 percent of the lactose to lactulose.

The reaction mixture is rapidly cooled to 25° C. by addition of 2160 gallons of cold water and the use of an external heat exchanger. Thereafter 1400 pounds of 37 percent hydrochloric acid (140 gallon) are added to the reaction mixture with vigorous agitation to provide a pH of 6.7. An aluminum hydroxide gel is formed during the neutralization step. The net volume of the reaction mixture at this time is about 3600 gallon. The reaction mixture contains about 10 weight percent sugar, 2.3 weight percent sodium chloride and 3 weight percent aluminum hydroxide.

The reaction mixture is then transferred to a feed tank. The reaction mixture is fed continuously to a filtration apparatus utilizing 600 sq. ft. of cylindrical membrane tubes having a diameter of 1 inch. The membrane tubes are identified by the tradename Abcor HFA 180 membranes and the average pore size is about 20 A. The reaction mixture is pumped at a rate of 25 g.p.m., an inlet pressure of 47 p.s.i., an outlet pressure of 10 p.s.i., and a temperature of 45° C. The flow rate in the membrane tube is 10.2 feet per second. Additional water is continuously metered into the feed tank to maintain the volume of the material in the feed tank of 3600 gallon.

A filtration rate of 1.8 gallon/sq. ft./hr. is attained in the filtration apparatus. After operation for 10 hrs., 96 percent of the sugar in the reaction mixture is recovered in the filtrate. The filtrate volume at this time is about 11,000 gallon. The material remaining in the reaction vat contains about 860 pounds of aluminum hydroxide and about 114 pounds of sugar. This material may be discarded or may be treated to recover the aluminum hydroxide.

The 11,000 gallons of filtrate is concentrated in a vacuum pan to provide a syrup of 1400 gallon, containing 24 percent sugar and about 6 percent sodium chloride. The syrup is transferred to a 2000 gallon holding tank.

The syrup is then subjected to electrodialysis treatment. The electrodialysis apparatus is a unit containing 1600 square feet of membrane area and contains alternate anion-cation membranes. The electrodialysis apparatus is operated at an initial current density of 20 milliamps per square centimeter which falls to 2 milliamps per square centimeter at the end of the run. A counterflow solution containing 0.5 percent of sodium chloride is maintained in the electrodialysis apparatus. About 650 pounds of sodium chloride is removed from the syrup in 18 hours to provide a syrup having a conductivity of 90 mmhos/cm. Thereafter, the syrup is further concentrated in a vacuum pan to provide a syrup having 70 percent sugar solids.

What is claimed is:

1. In a method for the manufacture of ketose sugars from aldose sugars comprising providing a solution of aldose sugar, adding an alkali or alkaline earth aluminate catalyst to said solution to provide a reaction mixture, maintaining said reaction mixture at a temperature sufficient to substantially convert the aldose sugar to ketose sugar, adjusting the pH of said reaction mixture to within the range of 6 to 8 so as to precipitate said aluminate moiety of said aluminate catalyst and provide a reaction mixture containing an aluminum hydroxide precipitate in a sugar solution, the improvement comprising controlling the concentration of said aluminum hydroxide in said reaction mixture at a level of less than about 8 percent by weight, providing a flowing stream of said reaction mixture, moving said flowing stream of said reaction mixture at a flow rate of at least about 1 foot per second in a direction substantially parallel to a membrane while maintaining a pressure differential of from about 2 p.s.i.g. to about 2,000 p.s.i.g. across said membrane during said movement of said reaction mixture and transferring said sugar solution through said membrane.

2. A method in accordance with Claim 1 wherein said catalyst is sodium aluminate.

3. A method in accordance with Claim 1 wherein said catalyst is calcium aluminate.

4. A method in accordance with Claim 1 wherein said aldose sugar is present in said solution at a level from about 5 percent to about 60 percent by weight.

5. A method in accordance with Claim 1 wherein said aluminate catalyst is present in said sugar solution at a level of about 0.5 moles to about 4 moles of aluminate catalyst per mole of aldose sugar present in the sugar solution.

6. A method in accordance with Claim 1 wherein the temperature of said reaction mixture is maintained in the range of about 25° C. to about 130° C.

7. A method in accordance with Claim 1 wherein said pressure differential across said membrane is in the range of about 5 p.s.i.g. to about 500 p.s.i.g.

8. A method in accordance with Claim 1 wherein the flow rate of said reaction mixture across said membrane is in the range of from about 2 ft. per second to about 20 ft. per second.

9. A method in accordance with Claim 1 wherein said membrane has a pore size in the range of from about 10 A. to about 1000 A.

10. A method in accordance with Claim 1 wherein said membrane has a pore size within the range of about 15 A. to about 100 A.

11. A method in accordance with Claim 1 wherein said filtrate is further treated by dialysis or ion exchange to remove salt from said filtrate.

12. A method in accordance with Claim 11 wherein a sufficient amount of said salt is removed to provide a product having a specific conductivity of less than 100 mmhos/cm.

13. A method for recovering sugar from a reaction mixture including sugar and aluminum hydroxide comprising adjusting the pH of said reaction mixture to within the range of from about 6 to about 8, controlling the concentration of said aluminum hydroxide in said reaction mixture at a level of less than about 8 percent by weight, providing a flowing stream of said reaction mixture and moving said flowing stream at a flow rate of at least about 1 foot per second in a direction substantially parallel to a membrane while maintaining a pressure differential of from about 2 p.s.i.g. to about 2,000 p.s.i.g. across said membrane during said movement of said reaction mixture and transferring said sugar solution through said membrane.

14. A method in accordance with Claim 13 wherein said pressure differential across said membrane is in the range of about 5 p.s.i.g. to about 500 p.s.i.g.

15. A method in accordance with Claim 13 wherein the flow rate of said reaction mixture across said membrane is in the range of from about 2 ft. per second to about 20 ft. per second.

16. A method in accordance with Claim 13 wherein said membrane has a pore size in the range of from about 10 A. to about 1000 A.

17. A method in accordance with Claim 13 wherein said membrane has a pore size within the range of about 15 A. to about 100 A.

18. A method in accordance with Claim 13 wherein said filtrate is further treated by dialysis or ion exchange to remove salt from said filtrate.

19. A method in accordance with Claim 18 wherein a sufficient amount of said salt is removed to provide a product having a specific conductivity of less than 100 mmhos/cm.

References Cited

UNITED STATES PATENTS

| | | | |
|---|---|---|---|
| 3,546,206 | 12/1970 | Goth | 127—46 R |
| 2,140,341 | 12/1938 | Wallach | 127—54 |
| 2,845,369 | 7/1958 | Davis | 127—46 A |
| 2,487,121 | 11/1949 | Fetzer | 127—36 |
| 2,593,540 | 4/1952 | Cornwell | 127—54 X |
| 2,753,279 | 7/1956 | Cushing | 127—46 A |
| 3,432,345 | 3/1969 | Tsao | 127—42 |
| 3,505,309 | 4/1970 | Carubelli | 127—46 R |
| 3,684,574 | 8/1972 | Katz | 127—46 R X |

MORRIS O. WOLK, Primary Examiner

S. MARANTZ, Assistant Examiner

U.S. Cl. X.R.

127—42, 46 R, 46 A, 54; 423—111; 210—22, 23

UNITED STATES PATENT OFFICE
CERTIFICATE OF CORRECTION

Patent No. 3,850,905   Dated November 26, 1974

Inventor(s) Leon Tummerman

It is certified that error appears in the above-identified patent and that said Letters Patent are hereby corrected as shown below:

Co. 4, line 35 of patent "independent" should be --dependent--. (page 9, line 8 of specification)

Signed and sealed this 24th day of June 1975.

(SEAL)
Attest:

RUTH C. MASON
Attesting Officer

C. MARSHALL DANN
Commissioner of Patents
and Trademarks